United States Patent [19]

Feichtinger

[11] 4,253,240
[45] Mar. 3, 1981

[54] MEASUREMENT APPARATUS FOR INTERRUPTED SURFACES

[75] Inventor: Kurt Feichtinger, Katzwalchen, Fed. Rep. of Germany

[73] Assignee: Dr. Johannes Heidenhain GmbH, Traunreut, Fed. Rep. of Germany

[21] Appl. No.: 75,137

[22] Filed: Sep. 12, 1979

[30] Foreign Application Priority Data

Sep. 21, 1978 [DE] Fed. Rep. of Germany ....... 2841057

[51] Int. Cl.³ .......................... G01B 7/28; G01B 5/20
[52] U.S. Cl. ................................ 33/172 E; 33/147 L; 33/147 N; 33/178 E
[58] Field of Search ............. 33/172 E, 172 R, 178 R, 33/178 E, 147 L, 147 N

[56] References Cited

U.S. PATENT DOCUMENTS 3,210,854  10/1965  Wolfram et al. .................. 33/172 E

FOREIGN PATENT DOCUMENTS 732480  3/1943  Fed. Rep. of Germany ........ 33/172 E
960861  3/1957  Fed. Rep. of Germany .
1124710  3/1962  Fed. Rep. of Germany ........ 33/172 E
56354  11/1966  Fed. Rep. of Germany .
1126266  9/1968  United Kingdom .
1353441  5/1974  United Kingdom .

Primary Examiner—Harry N. Haroian
Attorney, Agent, or Firm—Hume, Clement, Brinks, Willian & Olds, Ltd.

[57] ABSTRACT

A measurement apparatus includes a measuring rod with a contact surface for contacting a workpiece. One or more proximity sensors is mounted on the measuring rod adjacent the contact surface. A brake shoe, responsive to the output of the proximity sensor, is provided to automatically clamp the rod in place when the sensor detects a surface interruption in the workpiece in order to prevent the rod from dipping into the interruption. The apparatus also includes a pair of leaf springs arranged to lift the rod and to separate the contact surface from the workpiece when the rod is clamped by the brake shoe.

15 Claims, 6 Drawing Figures

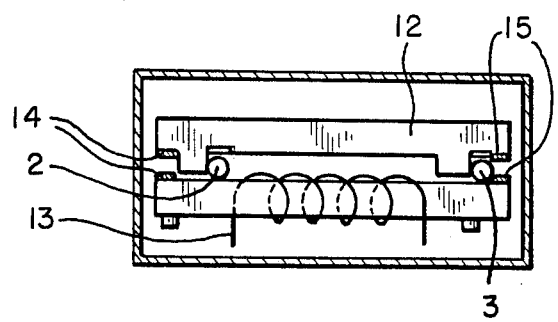
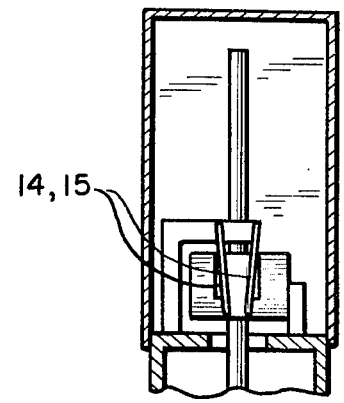
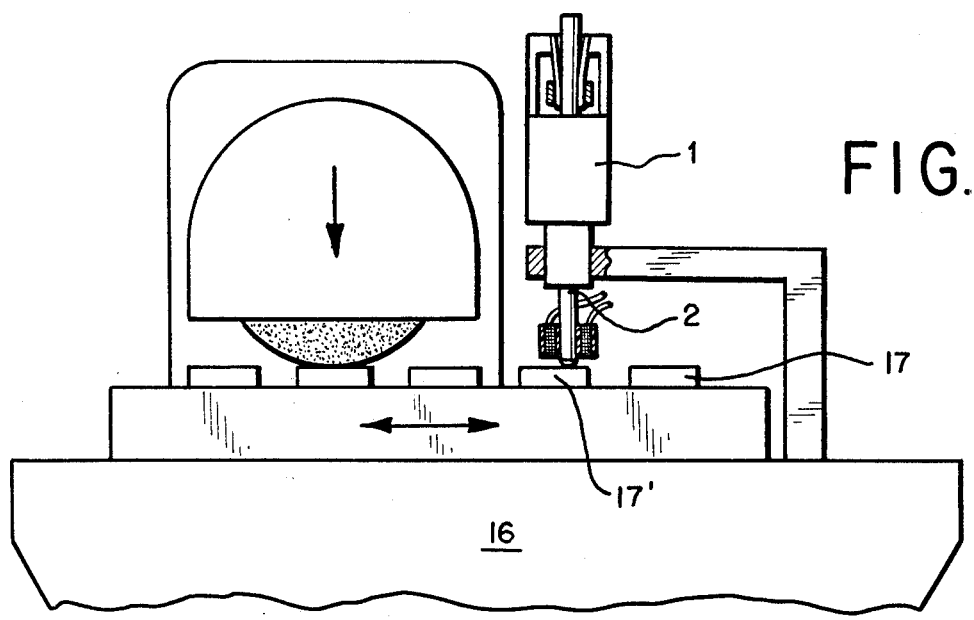
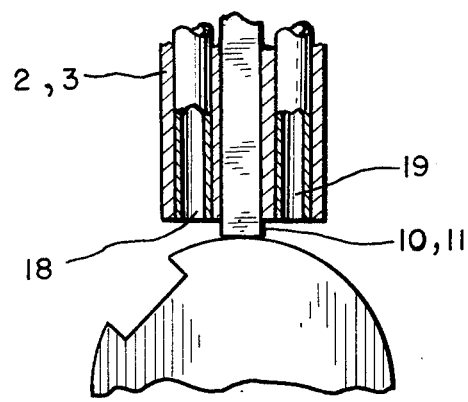
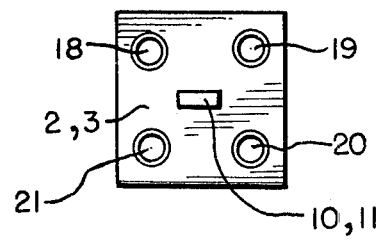

MEASUREMENT APPARATUS FOR INTERRUPTED SURFACES

BACKGROUND OF THE INVENTION

This invention relates in general to an apparatus for the measurement of workpieces having possible interruptions in their surfaces. Specifically, this invention relates to the type of measuring apparatus having at least one moveable measuring rod wherein movement of the rod can be blocked, and in which the blocking of the measuring rod is controlled by at least one sensor such that the measuring rod is blocked when a surface interruption reaches the measuring rod and the blocking is lifted when the surface interruption leaves the area of the measuring rod.

This general type of measurement apparatus is known in the art. In West German DE-PS 960 861 there is described an apparatus that can be used for continuous or sectional surveillance of the dimensions of workpieces. In this apparatus two sensors are suspended on plate springs so as to move in a counterdirectional manner. Movement of the sensors can be blocked periodically during the measurement process by means of blades. The blocking of the sensors is controlled by means of a switch which is synchronized with the periodic interruptions in the surfaces of the workpieces in the appropriate manner. One drawback of this approach is that surface interruptions are not automatically sensed in that the time during which the sensor is blocked must, therefore, be determined in advance.

Another prior art device designed to prevent a measurement sensor from dropping into a grooved workpiece during processing is described in West German DE-OS 14 48 391. In this device sensor movement is blocked for much of the time and is a function of the selected blocking time. Sensor movement is unblocked automatically after some delay time after a surface interruption passes the sensor and then, after a predetermined time, sensor movement is again blocked. This device has the disadvantage that it can be used only with workpieces which have been measured beforehand. Furthermore, the blocking apparatus of this measurement device must be synchronized to the geometry and the angular speed of the workpiece.

SUMMARY OF THE INVENTION

The present invention is directed to an apparatus for the measurement of workpieces which can be used to measure workpieces having surface interruptions and which does not exhibit the disadvantages mentioned above. A primary object of the present invention is to recognize surface interruptions automatically and to reliably prevent the dipping of the measurement rod into surface interruptions.

According to this invention, a measurement apparatus having at least one measuring rod with a contact surface and means for blocking movement of the rod is provided with one or more proximity sensors mounted on the measuring rod adjacent the contact surface. Signals generated by this proximity sensor control the blocking means such that movement of the measuring rod is blocked when the measuring rod is adjacent a surface interruption. A brake shoe is included in the blocking means for blocking the rod, and is spring mounted to a mounting element. Also included in the invention is means, included in the blocking means, for moving the rod to distance the contact surface from the workpiece when the blocking means is activated to block the movement of the rod.

The invention, together with further objects and attendant advantages, will be best understood by reference to the following description taken in connection with the appended drawings.

BRIEF DESCRIPTION OF THE DRAWINGS

FIG. 2 is a sectional view taken along line 2—2 of FIG. 1.

FIG. 3 is a sectional view taken along line 3—3 of FIG. 1.

FIG. 4 is a side view of a second preferred embodiment for the measurement of flat but interrupted surfaces.

FIG. 5 is a partial cutaway view of a measurement rod having a pair of pneumatic proximity sensors.

FIG. 6 is an end view of a measurement rod having four proximity sensors.

DETAILED DESCRIPTION OF PREFERRED EMBODIMENTS

Figure 1:
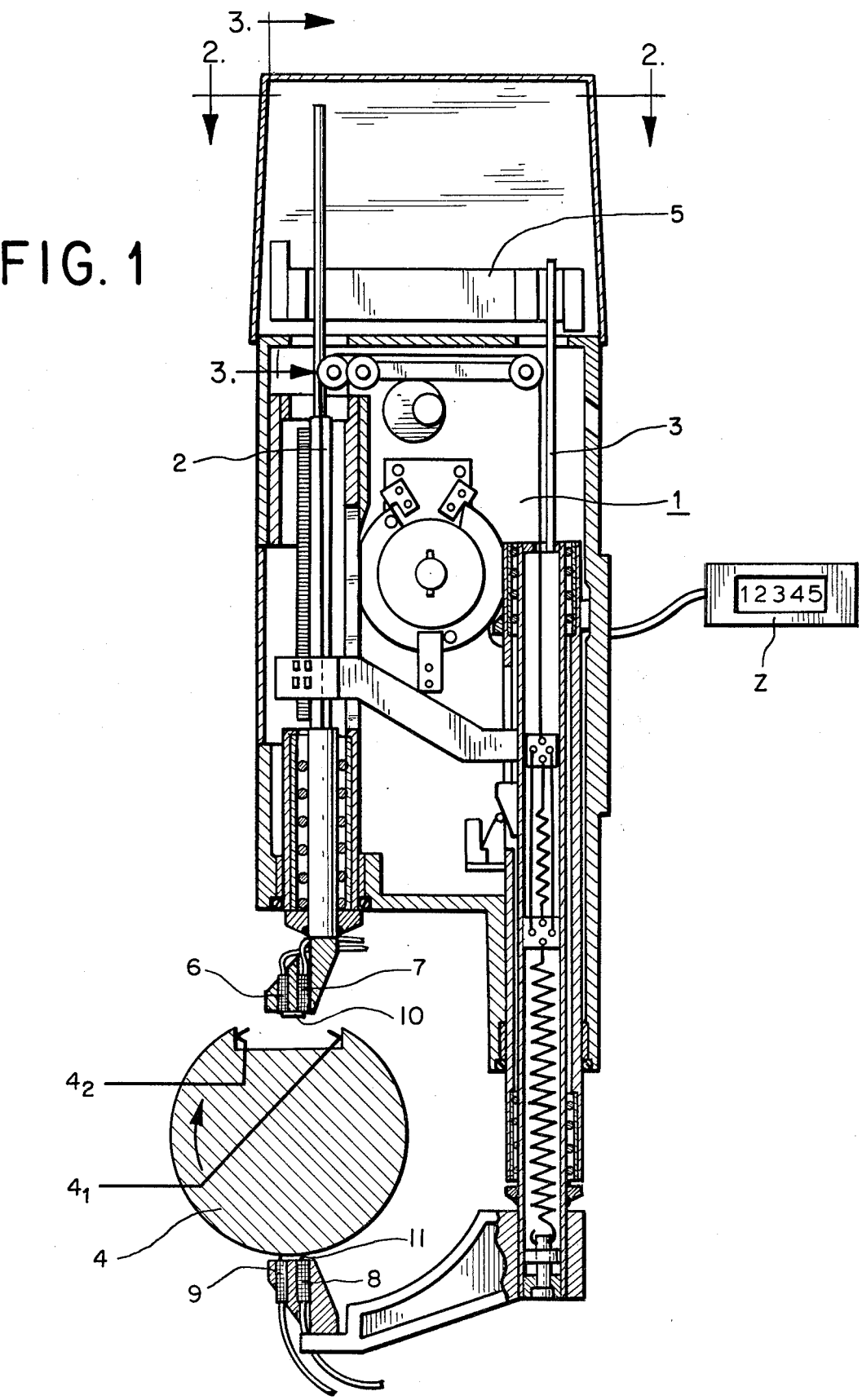
FIG. 1 is a sectional view of a first preferred embodiment for the measurement of grooved workpieces having circular cross sections.

Referring now to the drawings, FIG. 1 shows a diameter measuring apparatus 1 having two diametrically opposed moveable measuring rods 2 and 3. The positions of the measuring rods 2 and 3 are measured photoelectrically in a known manner. These measurements are transmitted to an evaluation unit Z for evaluation and display. The diametrical position of both measuring rods 2 and 3 provides a measure of the diameter of the workpiece 4. This type of measurement is especially useful in such operations as the grinding of cylindrical workpieces where the actual diameter of the workpiece is constantly being measured. Under the effect of the springs, the measuring rods 2 and 3 are pressed against the workpiece, which is rotated on its central axis in the direction of the arrow. When the workpiece 4 includes only one interrupted surface, in the form of a longitudinal groove, for example, the measuring rods 2 and 3 will dip into this groove when the groove comes in the area of each measuring rod 2 or 3, unless the movement of the rods 2,3 is appropriately blocked.

In this embodiment, a blocking installation 5 is provided to selectively block the movement of the measuring rods 2 and 3 in such a manner that their axial movement is stopped at the appropriate points in the measurement cycle. This blocking installation 5 is controlled by inductive proximity sensors 6,7,8,9 which are installed directly on the measuring rods 2 and 3 in the immediate vicinity of the contact surfaces 10,11, respectively. The blocking installation 5 includes a spring mounted brake shoe 12 (FIG. 2) which is activated electromagnetically by a coil 13. When an electrical current is passed through the coil 13, a magnetic field is created which pulls the brake shoe 12 toward the rods 2,3 and thereby blocks the movement of the measuring rods, 2,3.

When during the rotation of the workpiece 4 and the first groove edge $4_1$ reaches the inductive proximity sensor 6 or 8, signals generated by the sensor control the flow of current through the coil 13, causing the measuring rods 2,3 to be blocked by the brake shoe 12. This blocking prevents the measuring rods 2,3 from dipping into the groove. When the second groove edge $4_2$, which marks the termination of the groove, reaches the inductive proximity sensor 7 or 9, current in the coil 13 is interrupted and the measuring rods 2 and 3 are again free to move in an axial manner. The brake shoe 12 is suspended from V-shaped leaf springs 14,15 (FIG. 3) which, because of their inclined position, lift the measuring rods 2 and 3 slightly (about 2 microns) from the workpiece 4 during the clamping process. Through this effect the contact surfaces 10,11 are cleared from the workpiece 4 and the measuring rods 2,3 are not subject to transverse forces.

The present invention should be understood to encompass a kinematic reversal in which the brake shoe is controlled to constantly block the movement of the measuring rods and a proximity sensor is used to relax the brake shoe to lift this blocking. The particular arrangement chosen will be dependent on the conditions under which the measurement apparatus is to be used.

FIG. 4 shows a second preferred embodiment of the invention including a measurement apparatus 1 having only one moveable measuring rod 2 installed in a surface grinding machine 16. This grinding machine 16 acts to grind workpieces 17,17' and the measurement installation 1 measures the actual thickness of the workpieces 17,17'. Interruptions between the workpieces 17 and 17' do not influence the measurement as the measuring rod 2 is blocked in the manner stated above during a surface interruption.

FIG. 5 shows an alternate embodiment of a proximity sensor suitable for use in this invention. This embodiment includes two pneumatic proximity sensors, each of which includes a pneumatic nozzle 18,19 through which a fluid is directed against the workpiece. Fluid pressure in and fluid flow through the nozzles 18,19 is a function of the separation between the nozzles 18,19 and the workpiece, and variations of these parameters can be used to measure the proximity of the workpiece in accordance with the "nozzle/deflecting plate" principle.

FIG. 6 shows a view of another preferred embodiment of the measuring rod 2,3 which is equipped with four proximity sensors 18,19,20,21. These proximity sensors can be either pneumatic or inductive proximity sensors. The arrangement of the four sensors around the contact surface 10,11 of the measuring rod 2,3 is advantageous for use in treatment processes in which the workpiece 4 is translated as well as rotated during processing. When, for example, the workpiece has a longitudinal groove which does not extend over the entire length of the workpiece, then proximity sensors to detect the end of the groove as well as its sides provide further protection for the measurement apparatus.

Of course, it should be understood that various changes and modifications to the preferred embodiments described herein will be apparent to those skilled in the art. For example, other types of proximity sensors and other means for measuring the positions of the measuring rods can be used. Such changes and modifications can be made without departing from the spirit and scope of the present invention, and without diminishing its attendant advantages. It is, therefore, intended that such changes and modifications be covered by the following claims.

I claim:

1. In an apparatus for measuring a workpiece, said apparatus including a measuring rod having a contact surface and means for blocking the movement of the rod, the improvement comprising:

proximity sensing means mounted on the measuring rod adjacent the contact surface, said sensing means generating a signal indicative of an interruption in the surface of a workpiece being measured, said blocking means responsive to said signal such that movement of the rod is blocked by the blocking means when the measuring rod is positioned adjacent a surface interruption;

a brake shoe, included in the blocking means, mounted to a mounting element, said brake shoe moveable between a first position, in which the shoe blocks movement of the rod, and a second position, in which the shoe allows movement of the rod; and means, included in the blocking means, for moving the rod to move the contact surface away from the workpiece when the blocking means is activated to block the movement of the rod.

2. The apparatus of claim 1 wherein the means for moving the rod includes a pair of leaf springs disposed such that the leaf springs are nonparallel and are arranged to pull the measuring rod in the direction of greater spacing between the springs when the blocking means is activated.

3. The apparatus of claim 1 wherein the sensing means includes an inductive proximity sensor mounted on the measuring rod adjacent the contact surface, said sensor generating a signal indicative of an interruption in the surface of the workpiece being measured.

4. The apparatus of claim 1 wherein the sensing means includes a pneumatic proximity sensor mounted on the measuring rod adjacent the contact surface, said sensor generating a signal indicative of an interruption in the surface of the workpiece being measured.

5. The apparatus of claim 1 wherein the sensing means includes first and second inductive proximity sensors mounted on the measuring rod adjacent the contact surface, said first and second sensors generating first and second signals indicative of an interruption in the surface of the workpiece being measured.

6. The apparatus of claim 1 wherein the sensor means includes four inductive proximity sensors mounted on the measuring rod adjacent the contact surface, each sensor generating a signal indicative of an interruption in the surface of the workpiece being measured.

7. The apparatus of claim 1 wherein the sensor means includes two pneumatic proximity sensors mounted on the measuring rod adjacent the contact surface, each sensor generating a signal indicative of an interruption in the surface of the workpiece being measured.

8. The apparatus of claim 1 wherein the sensor means includes four pneumatic proximity sensors mounted on the measuring rod adjacent the contact surface, each sensor generating a signal indicative of an interruption in the surface of the workpiece being measured.

9. The apparatus of claim 1 further including a second measuring rod whose contact surface is diametrically opposed to the contact surface of the first measuring rod.

10. The apparatus of claim 1 or 2 or 3 or 4 wherein the sensing means includes more than one and less than five proximity detectors placed adjacent the contact surface.

11. The apparatus of claim 2 wherein the pair of leaf springs serves to mount the brake shoe to the mounting element.

12. In an apparatus for measuring a workpiece, the apparatus including at least one measuring rod having a contact surface and means for blocking the movement of the at least one rod, the improvement comprising:

proximity sensing means, mounted on the at least one measuring rod adjacent the contact surface, for generating a signal indicative of an interruption in the surface of a workpiece being measured, the blocking means responsive to the signal such that movement of the at least one rod is blocked by the blocking means when a measuring rod is positioned adjacent a surface interruption;

a brake mechanism, included in the blocking means and mounted to a mounting element, the brake mechanism capable of assuming a first position in which movement of the at least one measuring rod is blocked and a second position in which movement of the measuring rods is allowed; and moving means, included in the brake mechanism, for causing the brake mechanism to move the at least one measuring rod to move the respective contact surface away from the workpiece when the brake means assumes its first position such that the at least one measuring rod is automatically moved away from the workpiece when the movement of the at least one measuring rod is blocked.

13. The apparatus of claim 12 wherein the means for moving the at least one rod comprises at least one pair of leaf springs disposed such that the two leaf springs of each pair are nonparallel to each other and are arranged to pull the at least one measuring rod in the direction of greater spacing between the pair of springs when the blocking means is activated.

14. The apparatus of claim 13 wherein the leaf springs serve to mount the brake mechanism to the mounting element.

15. In an apparatus for measuring a workpiece, the apparatus including at least one measuring rod having a contact surface and means for blocking the movement of each rod, the improvement comprising:

proximity sensing means, mounted on the at least one measuring rod adjacent the contact surface, for generating a signal indicative of an interruption in the surface of a workpiece being measured, the blocking means responsive to the signal such that movement of each rod is blocked by the blocking means when a measuring rod is positioned adjacent a surface interruption;

the blocking means comprising: a mounting element; at least one pair of leaf springs, each spring having a first and a second end, each spring mounted to the mounting element at its first end; a brake shoe, mounted to the second end of one spring of each pair of springs; and a coil mounted to the second end of the other spring of each pair of springs; the brake shoe and coil facing each other and having the at least one rod extending there between, the springs allowing the brake shoe and coil to move relative to one another such that the shoe and coil are capable of assuming a first position in which the shoe and the coil press the at least one rod there between to block the rod's motion, and a second position in which the shoe and the coil are separated, thereby releasing the at least one rod to allow it to move, the two springs of each spring pair oriented such that the second ends of the two springs are closer to each other than the first ends so as to form a substantially "V" shaped structure oriented in a plane parallel to the plane of the at least one measuring rod, the tip of the "V" pointing opposite the direction in which the at least one rod must move in order for its contact surface to radially move away from the workpiece, to cause displacement of the rod away from the workpiece when the blocking means assumes its first position.

* * * * *